Figure 3:
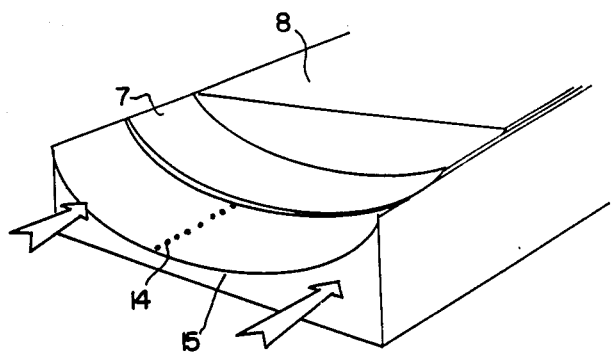

United States Patent [19]

McAskie

[11] Patent Number: 4,853,233

[45] Date of Patent: Aug. 1, 1989

[54] RUMINANT FEEDSTUFFS, THEIR PRODUCTION AND APPARATUS FOR USE THEREIN

[75] Inventor: William McAskie, Killeshandra, Ireland

[73] Assignee: Balfour Manufacturing Company, Dublin, Ireland

[21] Appl. No.: 222,889

[22] Filed: Jul. 18, 1988

Related U.S. Application Data

[60] Division of Ser. No. 848,144, Apr. 4, 1986, which is a continuation-in-part of Ser. No. 721,865, Apr. 10, 1985.

[30] Foreign Application Priority Data

| Apr. 10, 1984 | [GB] | United Kingdom | 8409213 |
| Aug. 1, 1984 | [GB] | United Kingdom | 8419582 |
| Oct. 14, 1985 | [AU] | Australia | 48555/85 |

[51] Int. Cl.$^4$ ............................................. A23K 1/00
[52] U.S. Cl. ............................... 426/74; 426/271; 426/541; 426/601; 426/623; 426/630; 426/807
[58] Field of Search ............ 426/74, 531, 541, 542, 426/601, 271, 623, 630, 807

[56] References Cited

U.S. PATENT DOCUMENTS

| 4,027,043 | 5/1977 | Schroeder et al. | 426/512 X |
| 4,062,988 | 12/1977 | Desantis | 426/69 X |
| 4,221,818 | 9/1980 | Schroeder | 426/518 |

OTHER PUBLICATIONS

Kirk-Othmer, "Encyclopedia of Chemical Technology", Third Edition, vol. 9 (1980) pp. 795, 800–801 & 804.

*Primary Examiner*—R. B. Penland
*Attorney, Agent, or Firm*—Lewis H. Eslinger; Donald S. Dowden

[57] ABSTRACT

The invention provides novel feedstuffs for ruminants comprising an edible water insoluble salt of an edible higher fatty acid, free fat, excess of the salt-forming metal, and optionally a further nutritional material, especially a proteinaceous feedstuff such as soya bean meal. Such feedstuffs may be produced by forming a mixture of a basic oxide such as calcium oxide, a mixture of fatty acid and triglycerides, water and optionally the further nutritional material, and allowing the oxide to react with the acid to form the water-insoluble salt. The hot reacting mixture is spread out so that water evaporates spontaneously and a friable product is obtained. The process is operated continuously.

12 Claims, 2 Drawing Sheets

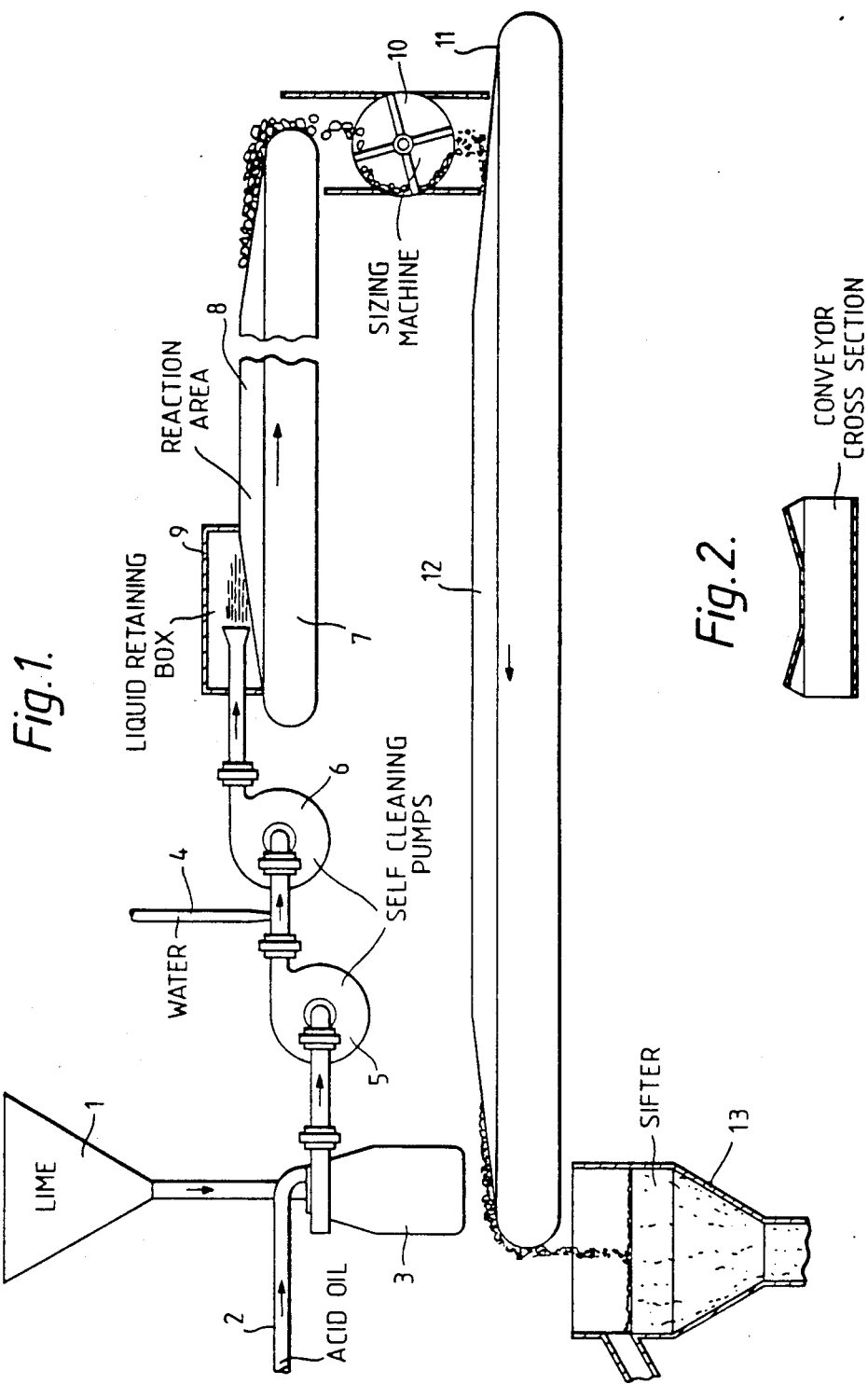

RUMINANT FEEDSTUFFS, THEIR PRODUCTION AND APPARATUS FOR USE THEREIN

This is a continuation of application Ser. No. 06/848,144, filed Apr. 4, 1986, which is a continuation-in-part of application Ser. No. 06/721/865, filed Apr. 10, 1985.

This invention relates to ruminant feedstuffs, and in particular to feedstuffs containing edible fatty acid salts, to their production and to apparatus for making the same.

While the processes of fermentation and digestion which take place in the rumen of ruminant animals are largely beneficial to such animals under natural feeding conditions, modern husbandry may require that, for optimum production of meat and/or milk, such animals should be fed a proportion of their dietary requirements in the form of nutrients which ideally should not undergo any alteration or degradation in the rumen. Also, it is necessary that such nutrients should not interfere with the normal processes of rumen fermentation.

For example, it is beneficial that a cow should be fed sufficient quantities of fat to maximise her milk production, but it is known that if a mature cow is fed more than about 500 g of fat per day, the normal process of rumen fermentation is adversely affected. Triglycerides and free fatty acids can physically coat fibrous or cellulosic material in the rumen and thus prevent it from being broken down by the rumen bacteria. This can have an adverse effect on the total digestability of the diet and result in a reduced yield of milk and/or butterfat. Free fatty acids and especially some unsaturated fatty acids are toxic to certain bacteria in the rumen and this too can have an adverse effect on the total digestibility of the diet. In addition, under normal conditions, unsaturated fats fed to ruminant animals are hydrogenated in the rumen with the result that it is difficult to produce milk containing a higher proportion of unsaturated fats. The production of milk containing increased amounts of unsaturated fatty acid thus requires that the fat be protected from normal rumen processes.

In the case of protein metabolism, it is known that at certain periods during the growth, development and lactation of cows, insufficient microbial protein is produced in the rumen to meet the animals full requirements for maximum growth or maximum milk production. It is therefore desirable that a proportion of the protein requirement of cows be met by supplying a supplement containing protein which is not degraded in the rumen. This can result in an improvement in feed conversion efficiency, growth rate and production as compared with the use of an equal weight of degradable protein.

There have been a number of proposals of methods for protecting fats and proteins from the effects of rumen fermentation so that they are not digested until they reach the abomasum or intestine of the ruminant. These methods have for the most part depended upon protecting such fats and/or proteins (and sometimes other nutritional materials such as minerals or essential vitamins) in a coating which resists the fermentation processes of the rumen.

The present invention provides a feedstuff for ruminants comprising a water-insoluble salt of one or more edible higher fatty acids. The feedstuff may contain a further nutritional material, which may be, for example, a protein, a mineral, or a vitamin.

The ruminant feedstuff of the invention comprises:

(1) 60 to 80%, preferably 70 to 75%, by weight of said feedstuff of a mixture of one or more edible, water-insoluble salts especially calcium salts, of one or more edible, saturated or unsaturated fatty acids containing 14, 16 and/or 18 carbon atoms each, with not more than minor amounts of fatty acids containing 12 and/or 20 carbon atoms each, the said fatty acid or mixture of fatty acids having an iodine value of less than about 60, and a melting point of at least 30° C., preferably above 40° C.;

(2) 5 to 15%, preferably 7 to 12%, of extractable triglycerides by weight of said fatty acid or fatty acids;

(3) a metal content corresponding to 9 to 15%, preferably 11 to 14%, by weight of edible metal oxide after calcination at 850° C.;

(4) less than 3%, usually 0.5 to 2%, by weight of unsaponifiable organic matter; and (5) up to 10%, usually 3 to 5%, by weight of water.

The ruminant feedstuff of the invention is made by forming a mixture of calcium oxide or other edible water-insoluble basic oxide, one or more fatty acids, and water, allowing the calcium (or other) oxide to react exothermically with the said acid to form the calcium (or other water-insoluble) salt thereof, and spreading out the hot, reacting mixture so that sufficient water evaporates spontaneously from the mixture to give a friable product. The reaction between the oxide and the acid normally starts spontaneously with little delay after the water has been added, but if necessary the mixture may be heated (before or after the addition of the water) to ensure that rapid reaction occurs.

More particularly, a ruminant feedstuff of the invention is produced by continuously forming a mixture of (1) one or more edible, saturated or unsaturated fatty acids containing 14, 16 and/or 18 carbon atoms each, with not more than minor amounts of fatty acids containing 12 and/or 20 carbon atoms each, the said fatty acid or fatty acids having an iodine value of less than about 60 and a melting point of at least 30° C., and being mixed with triglycerides of said fatty acids and unsaponifiable material in the proportions of 60 to 90%, preferably 70 to 80%, by weight of said acids, 40 to 10% by weight of said triglycerides and less than 3% by weight of unsaponifiables;

(2) one or more edible basic oxides capable of forming edible, water-insoluble salts with said fatty acids, the weight of the said oxide (2) being from 20 to 80% in excess of the weight equivalent of the total fatty acids fatty acid mixture (1); and (3) water in a proportion of 10 to 30%, preferably 18 to 20%, by weight of said fatty acids and triglycerides (1); homogenizing said mixture before substantial chemical reaction takes place, continuously spreading out said mixture at above 60° C. and allowing said mixture to react exothermically to form water-insoluble salts of said fatty acids; and continuously maintaining the reacting mixture in a spread-out configuration until it has cooled to below 70° C. and sufficient water has evaporated to give a friable product.

Preferably, the fatty acids and triglycerides are first mixed with the basic oxide, and the water is then added. Alternatively, the fatty acids and triglycerides, the basic oxide and the water may be mixed simultaneously. Other possibilities are first to mix the fatty acid and triglycerides with the water and then to add the oxide, or first to mix part of the fatty acids and triglycerides with the water and the remainder with the oxide and then to combine the two mixtures.

The process may be operated so that a proteinaceous feedstuff is incorporated in the final product. Thus it can be advantageous to produce feedstuffs comprising a good quality animal or vegetable protein such as, for example, grass meal, lucerne meal, field beans, pea protein, coconut meal, cotton seed, ground nut, linseed, palm kernel, soya bean, defatted soya bean meal, sunflower seed, rape seed, fish meal, meat and bone meal, skim milk, whey protein, distillers by-products, barley, maize, oats, rye, rice, gluten meal, locust bean, canola, feather meal, sorghum, safflower seed, single cell protein, or yeast. All of these materials are suitable, if necessary after appropriate comminution, for feeding to ruminants to improve the quality of their protein intake. This aspect of the invention is described below with reference to the use of defatted soya bean meal, but it will be understood that other proteinaceous feedstuffs can be substituted therefor.

The fatty acids used in the invention are edible, saturated or unsaturated fatty acids containing 14, 16 and/or 18 carbon atoms per molecule, preferably stearic acid, myristic acid, palmitic acid, oleic acid, linoleic acid or linolenic acid. It is normally preferred to use a naturally occurring mixture of such fatty acids derived from, for example, beef or mutton tallow, palm oil, or lard. Such materials are produced as by-products of edible oil refining. They normally contain, in addition to one or more fatty acids, also a proportion of the corresponding triglycerides. The presence of such triglycerides is necessary in the process of the invention to ensure that satisfactory product is obtained. Beef tallow acid oil and palm acid oil and fatty acid distillates obtained therefrom (which normally include an appropriate proportion of triglycerides) are particularly suitable for use in the present invention.

Palm fatty acid distillate is a commercial product produced by distilling off in vacuo the fatty acids present in natural palm oil. Typically it contains:

| Free fatty acids | 60–90%, usually 70–80%, by weight |
|---|---|
| Water | <1% by weight |
| Triglycerides | 10–40%, usually 20–30%, by weight |
| Unsaponifiables | less than 3% by weight |

The iodine value is less than 54 and the melting point is 40° to 47° C., usually about 45° C. The content of peroxides is below 10 milliequivalents of oxygen per kilogram. The fatty acids in the free fatty acids and the triglycerides typically consist of

| Palmitic acid | 38–45% by weight |
|---|---|
| Oleic acid | 37–42% by weight |
| Linoleic acid | 8–10% by weight |
| Stearic acid | 3–5% by weight | plus trace amounts of lauric, myristic, and linolenic acids.

Beef tallow acids, which are available commercially as a by-product obtained by alkaline extraction of waste beef fat and subsequent acidification are also suitable for use in the present invention. They typically contain

| Free fatty acids | 60–90%, preferably 70–80%, by weight |
|---|---|
| Triglycerides | 10–40%, preferably 20–30%, by weight |
| Water | <1% by weight |
| Unsaponifiables | <3% by weight |

The iodine value is less than 50 and the melting point is 45°–45° C. The content of peroxides is less than 10 milliequivalents of oxygen per kilogram. The fatty acids in the free fatty acids and in the triglycerides typically consist of

| Palmitic acid | 22–28% by weight |
|---|---|
| Oleic acid | 38–44% by weight |
| Linoleic acid | 3–6% by weight |
| Stearic acid | 18–24% by weight | plus trace amounts of lauric, myristic and linolenic acids.

Hog fat acids and mutton tallow acids can also be

To protect the finished product from atmospheric oxidation it is necessary, or at least desirable, to incorporate an anti-oxidant in the higher fatty acids and corresponding triglycerides. This is especially the case where unsaturated fatty acids are present. It is therefore preferred to use in manufacturing the feedstuff a mixture of fatty acids and triglycerides having an iodine value less than 60 and a peroxide content (value) less than 10 milliequivalents of oxygen per kg, and to incorporate in the feedstuff a permitted oil-soluble antioxidant (i.e. an antioxidant permitted by the Food and Drug Administration for inclusion in animal feeds) and a permitted chelating agent to bind any ferric, copper, zinc or other transition metal ions capable of catalysing atmospheric oxidation which may be present. The antioxidant, which is preferably butylated hydroxy-toluene, is preferably added in an amount sufficient to suppress peroxide formation on exposure of the feedstuff to air. The chelating agent, preferably citric acid, is added in amount sufficient to bind the metal ions likely to be present and thus prevent them from catalysing oxidation of the fatty acids. Suitable proportions are 0.025–0.075%, preferably 0.05%, butylated hydroxytoluene or other antioxidant and 0.05–0.25%, preferably 0.15%, citric acid, or other chelating agent, based on the weight of the acid oil. To ensure homogenous mixing, the chelating agent is preferably first dissolved in a small quantity (e.g. an equal weight) of an edible solvent which is miscible with the acid oil, e.g. propylene glycol, and the solution is added to the acid oil before the process. The ant-oxidant is normally oil-soluble and presents no mixing problem.

Calcium oxide is the preferred basic oxide for use in the new process, but other basic oxides which are non-toxic and form water-insoluble fatty acid salts, and in particular magnesium oxide, can in principle be used. Burnt (calcined) limestone is a suitable commercial source of lime. It usually contains 94–96% CaO and not more than 7% (usually 3 to 5%) of $CaCO_3$. It should preferably have a particle size such that 99% passes a 150 mesh for easy mixing with the other starting materials. A special grade of commercial product is usually satisfactory in this respect. Calcined magnesite is a suitable source of magnesium oxide. If desired calcium oxide and magnesium oxide can be used in admixture.

In one way of operating the new process, the fatty acid and the non-toxic basic oxide are first rapidly mixed, and water is added. It is also possible to mix all the ingredients simultaneously.

A third possibility is to mix the fatty acids and triglycerides with the water and then to add the mixture to the basic oxide. It is also possible to mix part of the fatty acids and triglycerides with the water and the remainder of the fatty acids and triglycerides with the basic oxide, and then to combine the two mixtures.

Preferably, the fatty acid is preheated, e.g. to 80°-100° C., preferably 95° C., and then thoroughly mixed with, lime. After the addition of water, there is a short induction period, and then a rapid reaction occurs between the oxide, the water, and the fatty acid. This reaction is sufficiently exothermic to raise the temperature of the mixture to over 100° C. under normal conditions. The mixture should be rapidly spread out, preferably on a moving continuous conveyor belt, and at a temperature of about 70° C., before substantial reaction takes place. The steam formed in the reaction is rapidly dispersed while the product is on the conveyor belt. A friable, easy to handle product is thus rapidly and conveniently obtained.

If any proteinaceous or other nutritional material is used, it is likely to contain a small proportion of water even though it appears to be "dry". The presence of such small amounts of water should be taken into account in forming the initial mixture but drying of these starting materials is not normally required.

The amount of water added is sufficient to permit rapid reaction between the fatty acid and the calcium (or other) oxide but not so great as to cause any problem or unnecessary expenditure of energy in subsequently removing it to give a dry product. It may sometimes be advantageous to add the required water in the form of liquid water preheated to near the boiling point, e.g. to 90° C., but usually water at ambient temperature is satisfactory. As stated above, the fatty acid is preferably hot when added to the mixture. Under normal conditions, the calcium oxide and the fatty acid react with sufficient generation of heat to raise the temperature sufficiently so that when the product is spread out evaporation takes place and a dry product is easily and rapidly obtained.

The proportions of the starting materials are chosen so that the product obtained shall have the desired nutritional composition and also the requisite physical properties. The proportion of the basic oxide used is rather more than the stoichiometric amount calculated to react with the total fatty acids present. The feedstuff product should contain about 9 to 15% by weight of the edible metal oxide, usually calcium oxide or, less preferably, magnesium oxide, as determined by calcination of the product at 850° C. Use of up to about an 80% excess of the lime or other basic oxide, over the stoichiometric amount, assures that this result shall be obtained. With the preferred palm acid oil, this is equivalent to using 10 to 15%, and preferably about 12-13%, of calcium oxide based on the combined weight of the palm acid oil and the oxide.

The proportion of water added is preferably the minimum amount consistent with securing rapid and complete reaction between the fatty acids and the basic oxide. For example, when the fatty acids are palm acid oil (containing about 75% of fatty acids consisting mainly of palmitic acid, oleic acid and linoleic acid), and the basic oxide is calcium oxide, then it is preferred to use one part by weight of calcium oxide to 7.0 parts by weight of the acid oil. The amount of water then added may be 15-25% and preferably about 18% by weight of the total weight of the acid oil.

When nutritional material is used, a satisfactory product is usually obtained if the fatty acids and triglycerides and the nutritional material are used in approximately equal weights, for example from 35-60% of fatty acids and triglycerides to 65-40% of nutritional material. Preferably, if the nutritional material is defatted soya bean meal (containing not more than 2% of fat and 7-8% of water), the proportion used may be about 8 parts by weight to each seven parts by weight of the acid oil.

The process of the present invention is operated continuously. Thus the calcium oxide (and soya meal or other nutritional material if present) may be mixed with the acid oil and the water and the mixture, before substantial reaction takes place, is fed rapidly through a nozzle onto a moving belt on which the reaction proceeds to completion. The temperature of the reacting mixture on the belt is in the range 100°-110° C., and most of the water present is boiled off while the mixture is on the belt. The latter is made long enough to allow the mixture to cool substantially and become converted into a dry friable product before it is sized, sieved and bagged. Cooling may, if desired, be hastened by blowing cool air over the mixture on the belt.

It is an advantage of the process that when ground whole soya bean is incorporated in the feedstuff as an additional nutritional material, the trypsin inhibitor present therein is substantially destroyed by the heat evolved during the process.

The invention includes within its scope apparatus for carrying out the process of the invention comprising means for continuously supplying measured amounts of said mixture of fatty acids and triglyceride, means for continuously supplying measured amounts of said basic oxide, and means for continuously supplying measured amounts of water; one or more mixing pump means for continuously mixing said fatty acids and triglycerides, for receiving the mixture from said pump or pumps arranged to permit the mixture to react thereon; sizing means for adjusting the size of the reacted product; and means for collecting said product.

A preferred apparatus for operating the process of the present invention is shown diagrammatically in FIG. 1 of the accompanying drawings. In FIG. 1, calcium oxide (lime) from the hopper 1, and hot palm fatty acid distillate or other acid oil (at e.g. 96° C.) from line 2 are mixed in predetermined proportions in the mixing pump 3. Water at ambient temperature is added through line 4. The mixture of starting materials, usually at about 65° C., is fed through mixing pumps 5 and 6 and rapidly discharged as a semi-liquid reacting mass at about 100° C. on to the continuously moving conveyor belt 7 as a layer 8. A liquid retaining box 9 is provided to keep the reacting mixture while it is still liquid from spilling over the edges of the conveyor belt. The latter has a concave cross-section as shown in FIG. 2. Steam is evolved from lumps of the product fall through a sizing (crumbling) machine 10 onto a second continuous conveyor belt 11 to form a layer 12. In this layer the reaction and the drying are completed.

From the belt 11, the now essentially dry product falls into the sifter 13 from which it is collected in appropriate bags for transportation and storage.

Accurate metering of liquid and solid components is desirable. With the liquid reagents (the acid oil and water), this is conveniently achieved by using a constant head device feeding the liquid through a fixed orifice of appropriate size.

An alternative arrangement for the conveyor belt is shown diagrammatically in FIG. 3. In this arrangement the belt 7 carrying the reacting mass 8 is supported by low pressure air (or other gas) fed in through holes 14 as it moves over a curved plate 15 which defines the cross-sectional configuration of the belt. This configuration makes it easier to control the temperature of the reacting mass (by controlling the temperature of the air fed in through holes 14) and causes less wear on the belt.

The apparatus can readily produce one tonne or more per hour of bagged product containing less than 5% by weight of water.

Under typical conditions, the mixture of calcium oxide, fatty acids and triglycerides, and water, can be formed, thoroughly mixed and discharged on to the first conveyor belt 7 in not more than 10 to 20 seconds, and times as short as 2 seconds have been achieved. When the process is first started, visible reaction of the lime with the acid oil begins within about 45 seconds, but in steady conditions, the mixture in the liquid retaining box 9 is visibly reacting as the fresh mixture is discharged by pump 6 into the box. The residence time on the first belt, which may be for example three to six feet (1 to 2m,) preferably about four feet (120 cm.), in width, is typically about 30 minutes, and the visible reaction lasts for about half this period. At the end of the first belt the product has a dry appearance and is at a temperature of about 95° C. It is then easily crumbled in the sizing machine 10 which has only a low power consumption. The crumbled product, now is about 65° to 70° C., then falls on to the belt 11 on which it may be cooled by a stream of cold air which also assists in the drying. Total overall time from mixing to bagging may be about 2½ to 3 hours.

The bagged product typically has a total fatty acid content, as calcium salt and free triglyceride, of about 85% by weight, a water content of about 3–5%, and a calcium content of 8 to 10% by weight (calculated as Ca), together with small but important amounts of the butylated hydroxy-toluene and citric acid already mentioned. The ash content, determined by calcining at 850° C., is not more than 15%, usually about 12.5%, by weight.

The initially formed mixture containing fatty acid, calcium and water is very sticky and it is important that the pumps 3, 5 and 6 are constructed so as to be able to handle the mixture without clogging or the need for frequent cleaning. Centrifugal pumps have been used with their impellers constructed so as to fit very closely the internal surface of the pump housing. This produces a self-cleaning action in the pump which can operate for several days without any stoppages for cleaning being required.

It is a simple matter, if desired, to include a separate nutritional material in the process described above so that, in the final product, the calcium (or other) salt of the fatty acid impregnates the nutritional material.

Some feedstuffs, especially liquid feedstuffs containing a substantial amount of water, e.g. whey, may be added in controlled amount to the mixture as it is discharged on to the belt 7. The heat of reaction is sufficient to dry substantial proportions of such feedstuffs.

I claim:

1. A continuous process for the production of a ruminant feedstuff comprising the steps of
    (1) continuously mixing (a) one or more edible, saturated or unsaturated fatty acids containing 14, 16 and/or 18 carbon atoms each and not more than minor amounts of fatty acids containing 12 and/or 20 carbon atoms each, the said fatty acid or fatty acids having an iodine value of less than about 60 and a melting point of at least 30° C., and being mixed with triglycerides of said fatty acids and unsaponifiable material in the proportions of 60% to 90% by weight of said acids, 40% to 10% by weight of said triglycerides and less than 3% by weight of unsaponifiables; (b) one or more edible basic oxides which form edible, water-insoluble salts with said fatty acids, the weight of the said oxides being from 20% to 80% in excess of the weight equivalent of the total fatty acids; and (c) water in a proportion of 10% to 30% by weight of said fatty acids and triglycerides; said mixing being substantially completed before substantial chemical reaction takes place;
    (2) continuously spreading out said mixture obtained in step (1) at above 60° C. in a continuously moving layer and allowing said mixture to react exothermically to form water-insoluble salts of said fatty acids; and
    (3) continuously maintaining the reacting mixture of step (2) in a spread-out configuration in said continuously moving layer until said reacted mixture has cooled to below 70° C. and sufficient water has evaporated to give a friable product.

2. Process according to claim 1 in which the fatty acids and triglycerides are first mixed with the basic oxide and the water is then added.

3. Process according to claim 1 in which the fatty acids and triglycerides, the basic oxide, and the water are mixed simultaneously.

4. Process according to claim 1 in which the fatty acids and triglycerides are first mixed with the water and the basic oxide is then added.

5. Process according to claim 1 in which part of the fatty acids and triglycerides is first mixed with the water and the remainder of the fatty acids and triglycerides is mixed with the basic oxide, and the two mixtures are then combined.

6. Process according to claim 1 in which the mixture reacts in a continuously moving layer at 100° to 110° C. and water in the reacting mixture is allowed to evaporate spontaneously.

7. Process according to claim 1 in which the said mixture of fatty acids contains

| | |
|---|---|
| 38 to 45% by weight | palmitic acid |
| 37 to 42% by weight | oleic acid |
| 8 to 10% by weight | linoleic acid |
| 3 to 5% by weight | stearic acid | and not more than trace amounts of lauric, myristic, linolenic and other fatty acids, and said mixture has a melting point of about 45° C.

8. Process according to claim 1 in which the said mixture of fatty acids and triglycerides is palm fatty acid distillate.

9. Process according to claim 1 in which the said mixture of fatty acids contains

| | |
|---|---|
| 38 to 44% by weight | oleic acid |
| 22 to 28% by weight | palmitic acid |
| 18 to 24% by weight | stearic acid |
| 3 to 6% by weight | linoleic acid | and minor amounts of other fatty acids, and said mixture has a melting point of about 40°–45° C.

10. Process according to claim 1 in which said mixture of fatty acids and triglycerides is beef tallow fatty acids.

11. Process according to claim 1 in which the basic oxide is calcium oxide.

12. A continuous process for the production of a ruminant feedstuff comprising the steps of
   (1) continuously mixing (a) 70% to 80% by weight of palmitic, oleic, linoleic, and/or stearic acids containing not more than trace amounts of lauric, myristic, linolenic and other fatty acids, the said mixture of fatty acids having an iodine value less than about 54, a melting point of 40° C. to 47° C. and a peroxide content less than 10 milliequivalents per kg mixed with 30% to 20% by weight of triglycerides of the said mixture of fatty acids, and less than 3% by weight of unsaponifiables; (b) calcium oxide in a proportion of 20% to 80% in excess of the stoichiometric amount required to react with said fatty acids; (c) water in a proportion of 18% to 20% by weight of said fatty acids and triglycerides; (d) butylated hydroxy-toluene in amount sufficient to prevent substantial atmospheric oxidation; and (e) citric acid in amount sufficient to chelate transition metal ions present in said mixture; said mixing being substantially completed before substantial chemical reaction takes place;
   (2) continuously spreading out said mixture obtained in step (1) at above 60° C. in a continuously moving layer and allowing said mixture to react exothermically to form water-insoluble calcium salts of said fatty acids; and
   (3) continuously maintaining the reacting mixture of step (2) in a spread-out configuration in said continuously moving layer until said reacted mixture has cooled to below 70° C. and sufficient water has evaporated to give a friable product.

* * * * *